US012790130B2

(12) United States Patent
Tondera et al.

(10) Patent No.: US 12,790,130 B2
(45) Date of Patent: Nov. 10, 2026

(54) HANDLING DEVICE AND USE OF A HANDLING DEVICE

(71) Applicant: TT Innovation AG, Zug (CH)

(72) Inventors: Marc Tondera, Riehen (CH); Tobias Jan Schneidler, Diepflingen (CH); Julia Annette Carli, Basel (CH); Mathieu Müller, Sierentz (FR); Philipp Leuenberger, Basel (CH); Christophe Rethoret, Issenheim (FR); Mike Zeller, Wahlen (CH)

(73) Assignee: TT Innovation AG, Zug (CH)

( * ) Notice: Subject to any disclaimer, the term of this patent is extended or adjusted under 35 U.S.C. 154(b) by 9 days.

(21) Appl. No.: 18/689,109

(22) PCT Filed: Sep. 27, 2022

(86) PCT No.: PCT/EP2022/076878

§ 371 (c)(1),
(2) Date: Mar. 5, 2024

(87) PCT Pub. No.: WO2023/031487

PCT Pub. Date: Mar. 9, 2023

(65) Prior Publication Data

US 2025/0243010 A1 Jul. 31, 2025

(30) Foreign Application Priority Data

Oct. 1, 2021 (EP) .................................... 21200500

(51) Int. Cl.
*B65G 47/26* (2006.01)
*B65G 25/04* (2006.01)
*B65G 47/22* (2006.01)
*B65G 54/02* (2006.01)

(52) U.S. Cl.
CPC ............ *B65G 47/26* (2013.01); *B65G 47/22* (2013.01); *B65G 54/02* (2013.01); *B65G 25/04* (2013.01); *B65G 2203/0283* (2013.01)

(58) Field of Classification Search
CPC ........ B65G 47/26; B65G 47/22; B65G 54/02; B65G 25/04
USPC .......................................................... 198/805
See application file for complete search history.

(56) References Cited

U.S. PATENT DOCUMENTS 3,841,468 A * 10/1974 Eggert .................. B65G 25/08 198/740
2015/0158611 A1* 6/2015 Kalany .................. B65G 47/26 53/531
2017/0225911 A1* 8/2017 Baechle ................. B65G 47/28
2017/0341875 A1* 11/2017 Baechle ................. B65G 19/26
(Continued)

FOREIGN PATENT DOCUMENTS

CN 109533963 A 3/2019
CN 111776737 A 10/2020
(Continued)

*Primary Examiner* — James R Bidwell
(74) *Attorney, Agent, or Firm* — Volpe Koenig

(57) ABSTRACT

A handling device (1) which has at least two object receivers (2) and at least one adjustment device (3), via which a distance (4) between the at least two object receivers (2) can be changed. At least one transport unit (5) acts on the adjustment device (3) so that the distance (4) between the at least two object receivers (2) can be changed by a movement of the transport unit (5).

17 Claims, 5 Drawing Sheets

(56) References Cited

U.S. PATENT DOCUMENTS

| | | | | |
|---|---|---|---|---|
| 2023/0137290 | A1* | 5/2023 | Boldrini | A24F 40/70<br>198/459.1 |
| 2024/0077838 | A1* | 3/2024 | Dolgovykh | G05B 23/0294 |

FOREIGN PATENT DOCUMENTS

| | | | | |
|---|---|---|---|---|
| DE | 202011004528 | U1 | 10/2011 | |
| DE | 102012201059 | A1 | 7/2013 | |
| DE | 102016106360 | A1 | 10/2017 | |
| DE | 102017208856 | A1 * | 11/2018 | B65B 59/005 |
| WO | WO-2017103813 | A1 * | 6/2017 | B65C 9/04 |

* cited by examiner

HANDLING DEVICE AND USE OF A HANDLING DEVICE

CROSS-REFERENCE TO RELATED APPLICATIONS

This application is a 371 National Phase of International Application No. PCT/EP2022/076878, filed Sep. 27, 2022, which claims priority from European Patent Application No. 21200500.3, filed Oct. 1, 2021, both of which are incorporated herein by reference as if fully set forth.

TECHNICAL FIELD

The invention concerns a handling device having at least two object receivers and at least one adjustment device, via which a distance between the at least two object receivers can be changed.

The invention furthermore concerns a use of a handling device.

BACKGROUND

Handling devices are devices which can move materials and/or objects from or to a process position. The handling devices themselves may perform manipulations on the objects. Handling devices are known which can receive at least two objects and change the distance between the at least two objects. A distance change is often performed during an object relocation or filling process, for example with vials and/or syringes and/or carpoules and/or ampoules, and thus plays an important role in the processing of foodstuffs, cosmetic products and pharmaceuticals.

The distance changes performed by handling devices are implemented by adjustment devices, usually by a motor, for example an electric motor, which is connected to at least two cranks, each of which may receive an object. The motor drives the movement of the cranks, causing a relative distance change between the objects. Such handling devices are usually stationary, which limits their area of application and hinders maintenance, since maintenance must usually be carried out at a specific location.

SUMMARY

The object of the invention is to improve handling devices of the type described initially.

The above object is achieved according to the invention by a handling device having one or more of the features disclosed herein. In particular, to achieve said object in a handling device of the type described initially, according to the invention it is proposed that at least one transport unit acts on the adjustment device so that the distance between the at least two object receivers can be changed by a movement of the transport unit.

A handling device according to the invention can thus cause a distance change by use of a transport unit, since the transport device acts on the adjustment device. The term "act" may for example means a brief, repetitive or permanent contacting of the transport unit on the handling devices. Thus an adjustment device may advantageously be designed to transfer the kinetic energy transmitted by the transport unit in an economic and variably controllable fashion, which improves a handling device.

Furthermore, a transport unit, in particular a transport unit held separately from the handling device, can be easily functionally replaced by a further transport unit in the case of a fault or during maintenance. Thus operation of the handling device may be carried out with less susceptibility to fault, which is advantageous.

It may furthermore be advantageous that various processes may be accelerated and/or coupled together by the use of a transport unit for changing distance.

For example, it may be provided that the transport unit moves and transports objects on which the adjustment device acts in order to cause a distance change of the at least two object receivers, and provides the transported objects for the handling device or a process station for further processing.

It is also advantageous that a transport process and a distance change process may be performed simultaneously, whereby a process duration may be reduced. In addition, a smaller surface area may be required in a process chamber since the two above-described processes may be performed by one handling device. Thus the risk of contamination or particle soiling may be reduced, which is advantageous in particular in clean rooms.

In an advantageous embodiment of the invention, it may be provided that the adjustment device is mechanical. The use of a mechanical adjustment device may be cheaper with respect to production and maintenance of the handling device. With a mechanical adjustment device, fewer materials such as for example seals or cables may be used, whereby abrasion surfaces and/or potential leakage points could be reduced. Furthermore, a handling device may be maintained, cleaned and sterilized more easily.

Thus an adjustment device may be implemented for example without electrical or hydraulic elements.

Alternatively or additionally, it may be provided that the adjustment device changes its longitudinal extent during adjustment of a distance. Thus the longitudinal extent of an adjustment device may be adapted depending on a process chamber or a process or rest position of the adjustment device. Furthermore, on a change of the longitudinal extent, a variability of the region in which the change of distance of at least two object receivers can be implemented may be advantageous.

In a further advantageous embodiment of the invention, it may be provided that the at least one transport unit is part of the handling device. Thus a handling device may itself be made movable, whereby the flexibility of the handling device is improved.

Alternatively or additionally, it may be provided that the at least one transport unit is part of a transport system. A transport system here means a system which consists of at least one transport unit and can move objects between at least two locations, for example between two process stations. Transport systems may be stationary, i.e. of fixed location, or movable. It is also conceivable that functional parts of the transport system are stationary while the or a transport unit is formed movable. Thus advantageously, a transport may be carried out by the or a transport unit without having to involve the entire transport system.

In a further advantageous embodiment of the invention, it may be provided that the at least one transport unit is formed passive or active. Thus with a handling device, advantageously switching between a passive or active transport unit is possible, which makes handling devices more flexible. Passive here means that the transport unit cannot move autonomously between two locations during a distance change.

In a further advantageous embodiment of the invention, it may be provided that the at least one transport unit is a mover. Alternatively or additionally, the transport unit may be magnetically coupled to a stator arrangement and/or be movable on a drive surface in at least one degree of freedom. The advantage with a mover is the frictionless movement on the drive surface, which may reduce or even prevent material abrasion of the transport unit.

Movers are for example known from the product XPlanar-Mover by Beckhoff Automation GmbH & Co. KG, Hülshorstweg 20. 33415 Verl.

In clean rooms in particular, use of a mover as a transport unit is highly advantageous since particle abrasion by the transport unit is reduced, whereby few to no cleaning processes need be performed inside the clean room.

Alternatively, the mover may be movable on the drive surface in at least two degrees of freedom, whereby the mover can be moved and used more flexibly.

In an advantageous embodiment of the invention, it may be provided that the handling device is movable. Thus the handling device can advantageously move, in particular between two process stations. Also, a movable handling device is advantageous for maintenance purposes, since the handling device can be moved up to a maintenance position by the transport unit and/or the transport system.

In particular, it may be provided that the movability of the handling device is implemented by the at least one transport unit. Thus the transport unit can move the handling device, and separately or simultaneously change the distance between the at least two object receivers, whereby processes may be synchronized, improving the handling device.

In an advantageous embodiment of the invention, it may be provided that the adjustment device has a gear mechanism, via which the movement of the at least one transport unit can be converted into a change of the distance. Thus a handling device can be improved since the change of distance can be implemented rapidly and without delay by the movement of the transport unit. It is furthermore advantageous that a gear mechanism cannot only achieve a change in distance, but also implement a change in vertical position and/or orientation of the object receivers. In this way, the area of application of a handling device can be widened and adapted to customer requirements.

In particular, a gear mechanism may be implemented with a scissor mechanism, whereby the movement of the at least one transport unit can be converted into a change of distance. The scissor mechanism may be produced economically, above all if the entire adjustment device is mechanical.

In a further advantageous embodiment of the invention, it may be provided that the change of distance can be implemented steplessly. Thus advantageously, the distance can be steplessly changed, whereby a greater bandwidth of process stations with different processing distances can be controlled by the same handling device. Thus the number of handling devices within a production line can be reduced, saving space and money, in particular if the handling device is movable.

For example, a handling device may transport vessels to a filling station to be filled, wherein the handling device establishes a specific distance between the vessels which depends on the design of the filling station. After filling of the vessels, the same handling device may implement a movement to a further process station, wherein a stepless change in distance between the filled vessels is performed which is adapted to the processing distance of the further process station. The processing distance is the distance between at least two object receivers and/or vessels received therein which a process station requires for implementing the process.

In a further advantageous embodiment of the invention, it may be provided that the distance between the at least two object receivers is variable in the same way. This may ensure that a processing distance for the at least two object receivers can be set, whereby a process can be carried out evenly and simultaneously for all objects present on the handling device.

Alternatively or additionally, it may be provided that the distance between the at least two object receivers changes in a defined ratio. Thus highly advantageously, the spacing of a handling device can be changed and/or controlled, whereby the handling device may be used more flexibly.

For example, a distance between at least two object receivers may be changed and defined uniformly or non-uniformly. A uniform and non-uniform distance change may also be implementable simultaneously if the handling device has at least three object receivers.

In a further advantageous embodiment of the invention, it may be provided that the adjustment device is pivotably connected to the at least one transport unit. Such a design is particularly advantageous if the handling device is movable, since a pivotable connection expands the degrees of movement of the handling device. It may also be advantageous that a pivotable connection changes the orientation of the transport unit relative to the adjustment device, whereby the transport unit may be used more flexibly.

In an advantageous embodiment of the invention, it may be provided that the adjustment device is connected, preferably pivotably, to a further transport unit which is preferably configured identically. In this way, the degrees of movement of the handling device may be further improved so that a fluid movement sequence can be implemented.

For example, the two transport units which are preferably pivotably connected together may be configured as two movers, whereby a fluid movement sequence of the handling device can be implemented. However, also a first transport unit may be configured as a mover and a second transport unit as a transport carriage. Thus the choice of transport units or transport system may be flexible and adapted to a process chamber.

In particular, it may be provided that actuation of the adjustment device can be implemented by a movement of the at least one transport unit relative to the further transport unit. Here it is advantageous that the kinetic energy can be converted directly into a distance change of the at least two object receivers, whereby a movement of the handling device can be synchronized with the distance change. Thus processes can be accelerated.

In an advantageous embodiment of the invention, it may be provided that the adjustment device is connected, preferably pivotably, to a fixed point. A fixed point may be a portion of a wall, a ceiling, a floor, a column or a process station. Thus the adjustment device may be anchored movably to a fixed point.

In particular, it may be provided that actuation of the adjustment device can be implemented by a movement of the at least one transport unit relative to the fixed point. Thus advantageously, the adjustment device and/or the handling device can move in a specific radius from or to the fixed point, whereby a working space of a processing device can be optimally utilized, in particular if the adjustment device can move about the fixed point as described above or claimed below.

In a further advantageous embodiment of the invention, it may be provided that at least one object receiver can receive a transport good, for example vials and/or syringes and/or carpoules and/or ampoules. Thus processing of the above-described transport good by a handling device, in particular as described above or in any of the claims directed at handling device, can be improved.

In a further advantageous embodiment of the invention, it may be provided that the transport unit and/or the handling device is/are movable in at least two degrees of freedom. These embodiments are advantageous if the transport unit and/or the handling device is to move freely on a work surface, in particular as described herein, for example in a clean room. Thus the handling device can be particularly flexibly movable, which is particularly advantageous if the transport unit and/or the handling device is to move from one location to another.

Preferably, the transport unit and/or the handling device is movable on a floor and/or a wall in two degrees of freedom. Thus in particular the above-described movement flexibility of the transport unit and/or the handling device can be implemented on multiple or even all work surfaces, in particular the work surfaces described herein. This is particularly advantageous if, as may be provided, the work surfaces at least partially define a clean room as described herein. Thus valuable space may be saved in a clean room. The embodiment is of quite particular advantage if the transport unit is a mover as described herein, whereby an abrasion loading in the clean room can be reduced with simultaneously improved use of space in the clean room.

In a further advantageous embodiment of the invention, it may be provided that the transport unit and/or the handling device can travel on a horizontally oriented work surface. Thus a transport unit and/or a handling device may travel optimally horizontally on a floor and/or a drive surface.

Alternatively or additionally, the transport unit and/or the handling device may travel on a work surface arranged obliquely and/or vertically relative to the horizontally oriented work surface. For example, the obliquely and/or vertically arranged work surface may be the wall described herein, which may be arranged as a wall of a clean room, in particular as described herein. Thus alternatively or additionally, a vertical and/or oblique movement of the transport unit and/or the handling device may be possible, whereby a particularly large amount of space may be saved. This embodiment is quite particularly preferred if the transport unit is configured as a mover and the oblique and/or vertical work surface has a drive surface as described herein.

Alternatively or additionally, to achieve said object according to the invention, the features of the auxiliary claim directed at use are provided. In particular to achieve said object, in a use of the type described initially, according to the invention it is provided that the transport unit is used for changing a distance between at least two objects held on a handling device. In particular, it is provided that a handling device as claimed below is used to change the distance. The use according to the invention of a transport unit for changing a distance between at least two objects held on a handling device, instead of the otherwise usual motorized distance changes, allows a more variable and improved handling, in particular in clean rooms as described above.

In a further advantageous embodiment of the invention, it may be provided that in a first pass, at least two objects are supplied at a first distance from one another and discharged at a second distance from one another, and in a second pass, at least two objects are supplied at a third distance from one another and discharged at a fourth distance from one another, wherein the first and third distances and/or the second and fourth distances are different from one another. Thus advantageously, a stepless distance change can be implemented in a continuous process.

BRIEF DESCRIPTION OF THE DRAWINGS

The invention will now be described below in more detail with reference to exemplary embodiments but is not restricted to these exemplary embodiments. Further exemplary embodiments arise from combination of the features of individual or multiple claims, and/or with individual or multiple features of the exemplary embodiments.

In the drawings.

DETAILED DESCRIPTION

Figure 1:
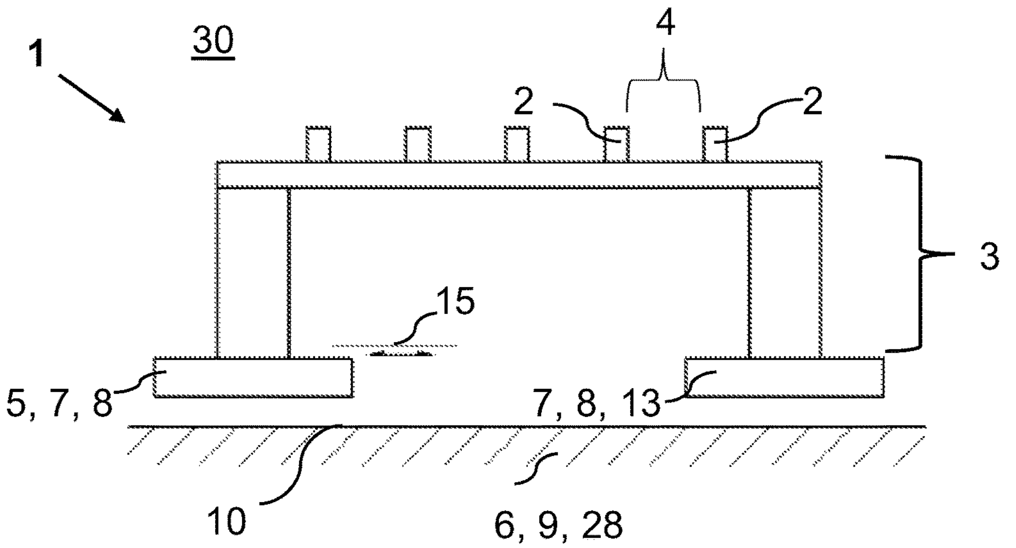
FIG. 1 shows a first handling device according to the invention with two movers as transport units.

FIG. 1 shows a first handling device 1 according to the invention which has five object receivers 2. The number of object receivers 2 in the handling devices 1 according to the invention may vary, in particular four or eight object receivers 2 may be used in practice.

The object receivers 2 are connected to an adjustment device 3 so that a distance 4 between the object receivers 2 can change. In the case of the handling device 1 shown in FIG. 1, the change in distance 4 takes place by a relative movement 15 of two transport units 5, 13 which are permanently in contact with the adjustment device 3. In an alternative embodiment, the transport units 5, 13 may also act releasably on the adjustment device 3. The transport units 5, 13 shown here are movers 8 of a transport system 7 which are magnetically coupled to a stator arrangement 9 and hover frictionlessly over a drive surface 10. Here, the stator arrangement 9 is integrated in a floor 6. Furthermore, the two movers 8 are connected by force fit to the gear mechanism 11 of the adjustment device 3 via a joint 19, similarly to the mover 8 shown in FIG. 6. In a further embodiment, the or a stator arrangement 9 may also, additionally or alternatively, be integrated in a wall 27 and/or a ceiling, for example with suspended transport units 5, 13 (see FIGS. 11 to 13). Such mover-stator arrangements could for example be used in clean rooms 30 in order to process and/or transport objects such as e.g. vials and/or syringes and/or carpoules and/or ampoules on a handling device 1.

Figure 3:
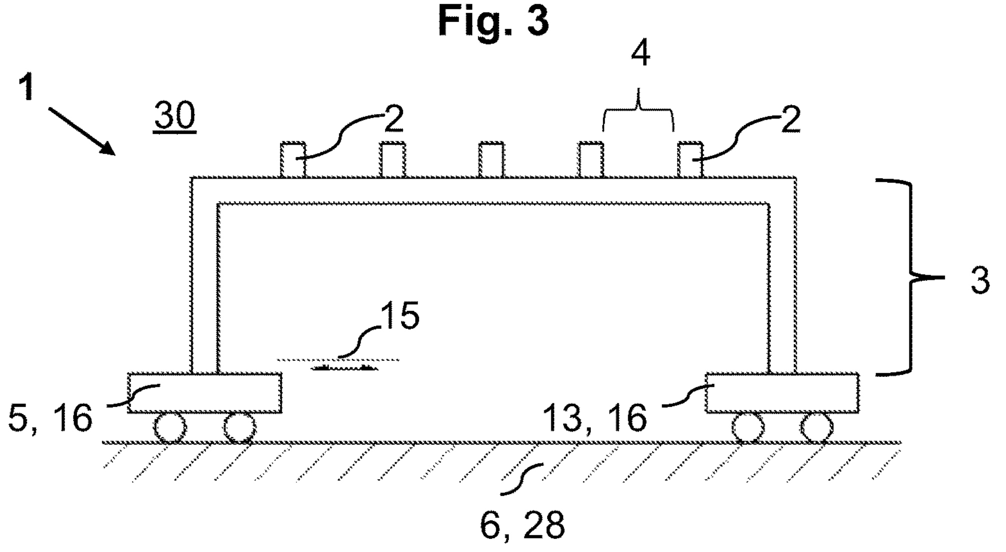
FIG. 3 shows a third handling device according to the invention with two transport carriages as transport units.

In general, the transport units 5 and/or transport systems 7 may also comprise transport carriages 16 (FIG. 3, FIG. 4), gripper arms 17 (FIG. 4), or other transport devices known to the person skilled in the art.

Figure 10:
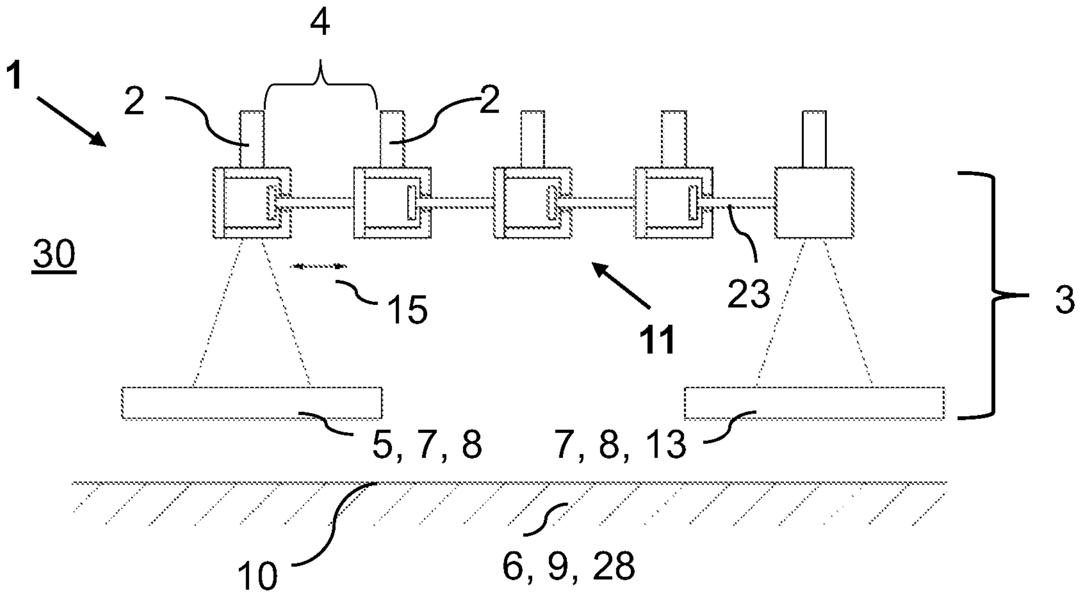
FIG. 10 shows an alternative handling device according to the invention with a further alternative gear mechanism.
Figure 11:
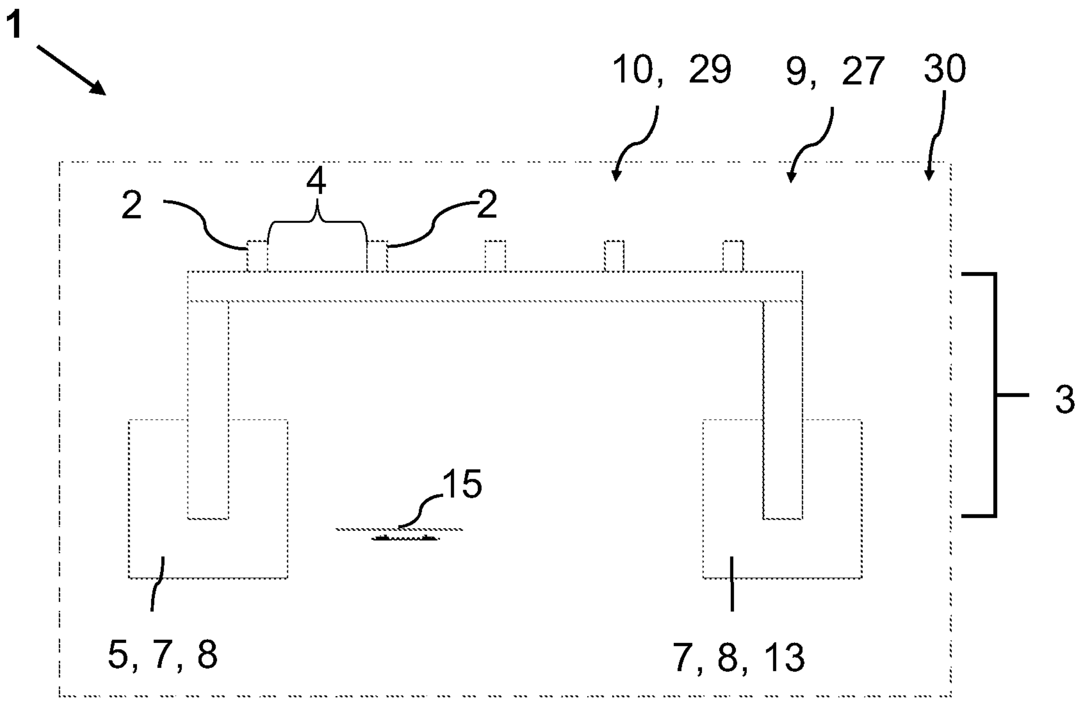
FIG. 11 shows a front view of an alternative handling device according to the invention which is movable on a vertical wall.
Figure 12:
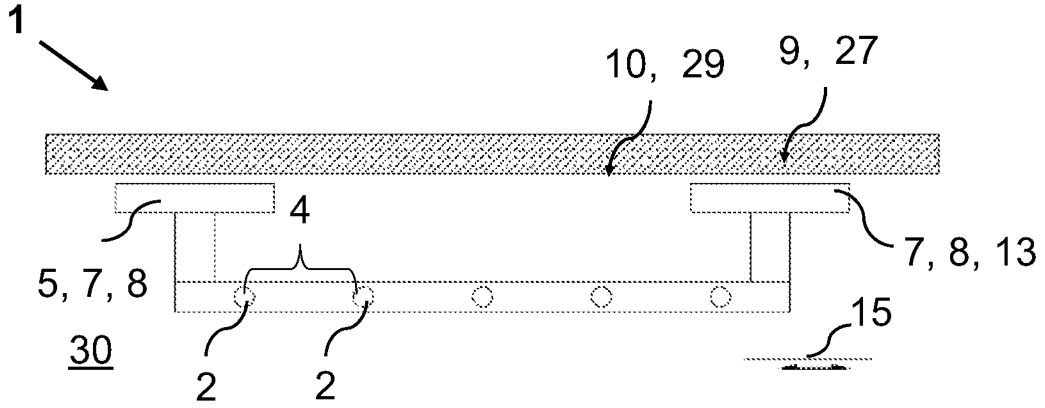
FIG. 12 shows the handling device according to the invention from FIG. 11 in plan view.
Figure 13:
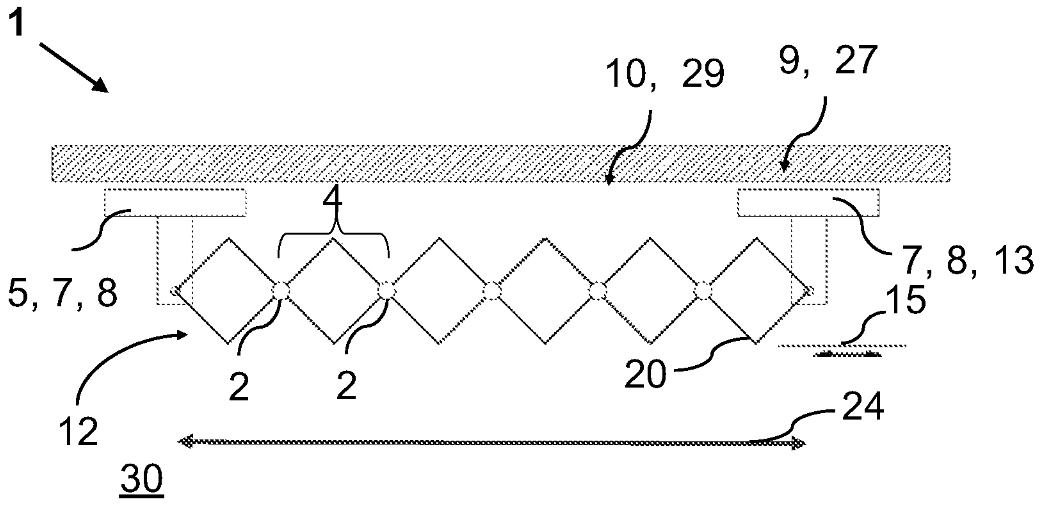
FIG. 13 shows a plan view of an alternative handling device according to the invention which is movable on a vertical wall.

The embodiments of transport units 5 or handling devices 1 shown move either on a floor 6, i.e. on or against a horizontally arranged work surface 28 (FIGS. 1 to 4, 6 to 10, 14, 15), or on a work surface 29 arranged vertically relative to the horizontally oriented work surface 28 (FIGS. 11 to 13). The vertical walls 27 of the embodiments shown in FIGS. 11 to 13 may also be oblique and/or at least partially oblique.

In an embodiment not shown, a transport unit 5, in particular a mover 8, and/or a handling device 1, may also travel on a horizontal work surface 28 and/or a vertical or oblique work surface 29. This is advantageous in particular if the transport unit 5 is a mover 8, and the handling device 1 is situated in a clean room 30. Thus particularly many work surfaces 28, 29 in a clean room 30 may be used.

The kinetic energy generated by the relative movement 15 of the movers 8 (FIG. 1) is transmitted to the adjustment device 3 such that the above-mentioned change in distance 4 of the object receivers 2 situated in the adjustment device 3 takes place. In the handling devices 1 illustrated in FIGS. 2 and 8, the change in distance 4 takes place by relative movement 15 between a transport unit 5 and a fixed point 14.

Figure 4:
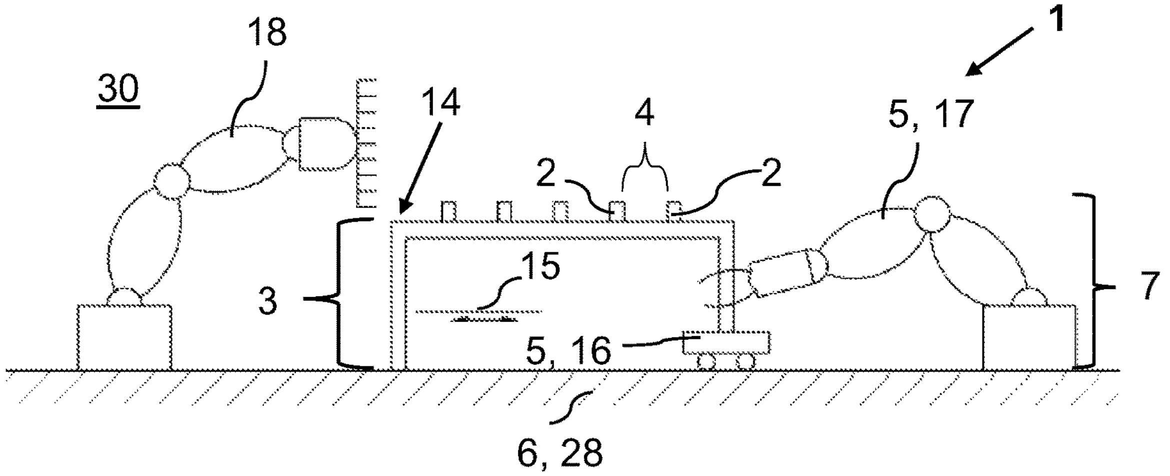
FIG. 4 shows a fourth handling device according to the invention with stationary and movable transport units.

FIG. 4 shows a further embodiment in which a transport unit 5 is configured as a gripper arm 17. The gripper arm 17 briefly or repeatedly acts on the adjustment device 3, exciting a relative movement 15 of a passive transport carriage 16 which is fixedly in contact with the adjustment device 3. Depending on a distance 4, a process station 18 may process the received objects. The gripper arm 17 may, as well as its function as a transport unit 5, also perform further processes.

It is also conceivable that the handling device 1 can move from one location to another. This is feasible for example in handling devices 1 in which the adjustment device 3 is not permanently attached to a fixed point 14. Handling devices 1 of variable location are illustrated in FIGS. 1, 3, and 6 to 15. On movement of the handling device 1 from one location to another, the distance 4 may also change. Both the above-described movement processes may be matched directly to one another, but it is conceivable that with variable-location handling devices 1, a change in distance 4 takes place shortly before and/or directly at a target position. A change in distance 4 may also be associated with a change in the longitudinal extent 24 (see FIG. 5). A target position may here be a process position, a maintenance position or a rest position.

Figure 14:
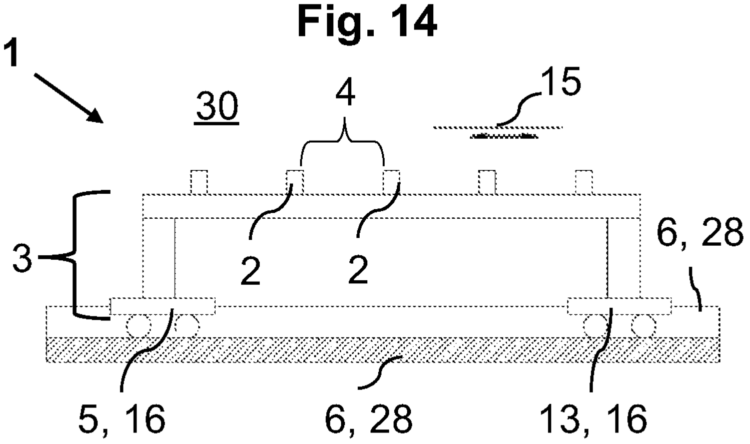
FIG. 14 shows a side view of an alternative handling device according to the invention which is movable in one dimension (guided)
Figure 15:
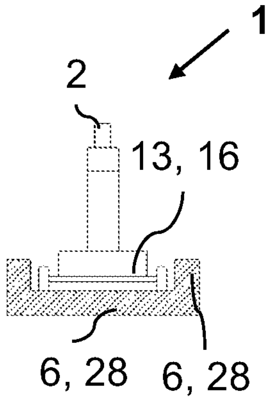
FIG. 15 shows the embodiment in FIG. 14 rotated through 90°.

The embodiments of handling devices 1 shown in FIGS. 1 4 and 6 to 13 can move in at least two degrees of freedom. However, FIGS. 14 and 15 show an embodiment of a handling device 1 which is guided and movable in only one degree of freedom. In this embodiment, the guide is formed by protrusions on the floor 6, 28. A guide may in particular be a rail guide. This embodiment is particularly advantageous if a handling device 1 is to be guided because of circumstances in the process chamber.

In particular, the embodiments of FIGS. 1, 3 and 6 to 13 have particularly great flexibility in their movability. Thus in particular, variable-location movements, in particular between remotely positioned process stations and/or between at least two remote locations, may be performed by the handling device 1.

Figure 2:
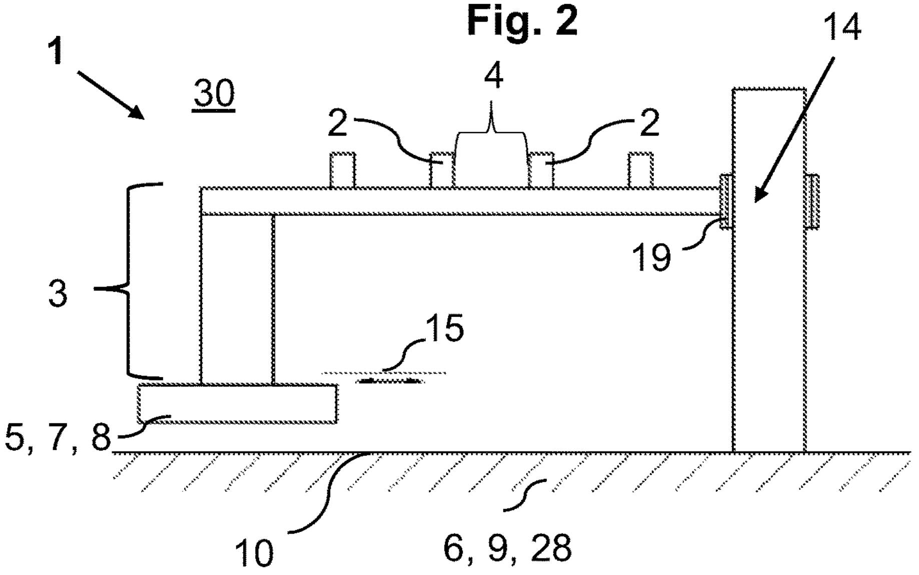
FIG. 2 shows a second handling device according to the invention, wherein the adjustment device is connected pivotably to a fixed point.
Figure 8:
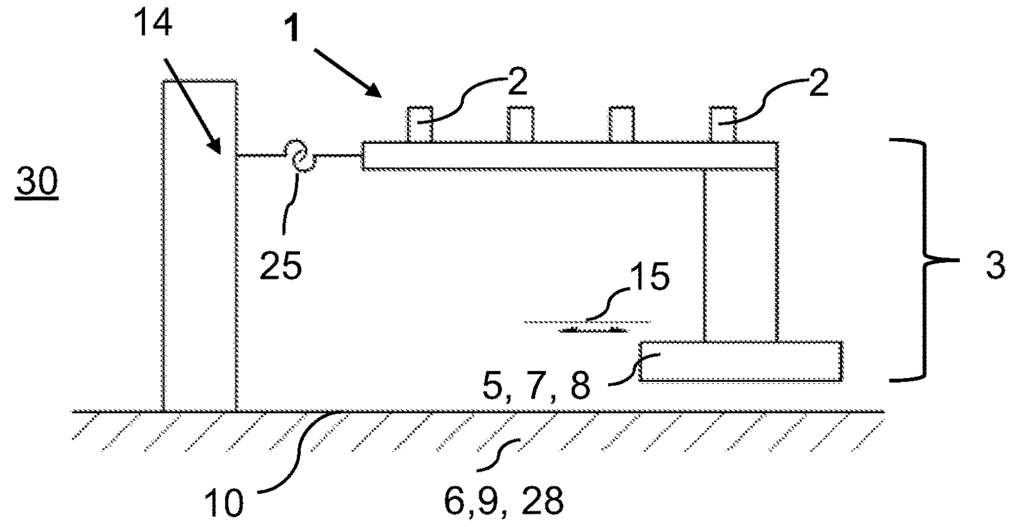
FIG. 8 shows an alternative handling device according to the invention which can travel to a fixed point.

FIG. 2 shows a handling device 1 in which the adjustment device 3 is fastened to a fixed point 14 via a joint 19. The handling device 1 may be moved by the mover relative to the fixed point 14 and/or through 360° about the fixed point 14. This a space around the fixed point 14 may be optimally utilized by the handling device 1. It is also conceivable that a handling device 1 is variable in location and can be anchored at a fixed point 14 via a coupling 25 (FIG. 8).

Alternatively or additionally to the transport units 5, 13 permanently coupled to the handling device 1, it is possible that a transport unit 5 may approach the handling device 1 so that the transport unit 5 acts briefly and/or repeatedly on the adjustment device 3 (see for example FIG. 2). Thus a change in distance 4 may be excited. Such a transport unit 5 can thus be made freely movable from the handling device 1.

Figure 5:
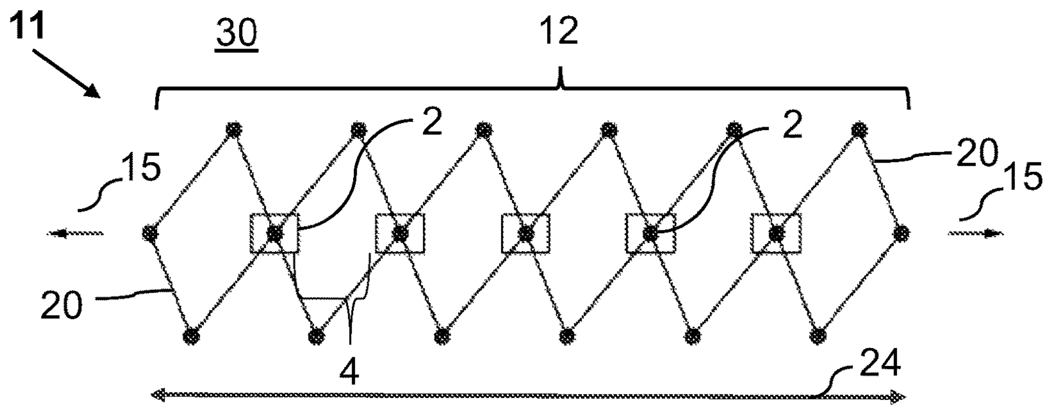
FIG. 5 shows a scissor mechanism of a gear mechanism.

The adjustment device 3 of the handling devices 1 shown in FIGS. 1 to 4 has a gear mechanism 11 which is configured as a scissor mechanism 12. Such a gear mechanism 11 is shown in FIGS. 5 and 13. The kinetic energy transmitted by a relative movement 15 of the at least one transport unit 5 can open or close the scissors 20, leading to a change in distance 4 of the object receivers 2 and a change in the longitudinal extent 24 of the adjustment device 3. A scissor mechanism 12 allows a stepless change in distance 4. As already described, the distance change may be implemented following and/or during a location-changing movement of a handling device 1.

Figure 6:
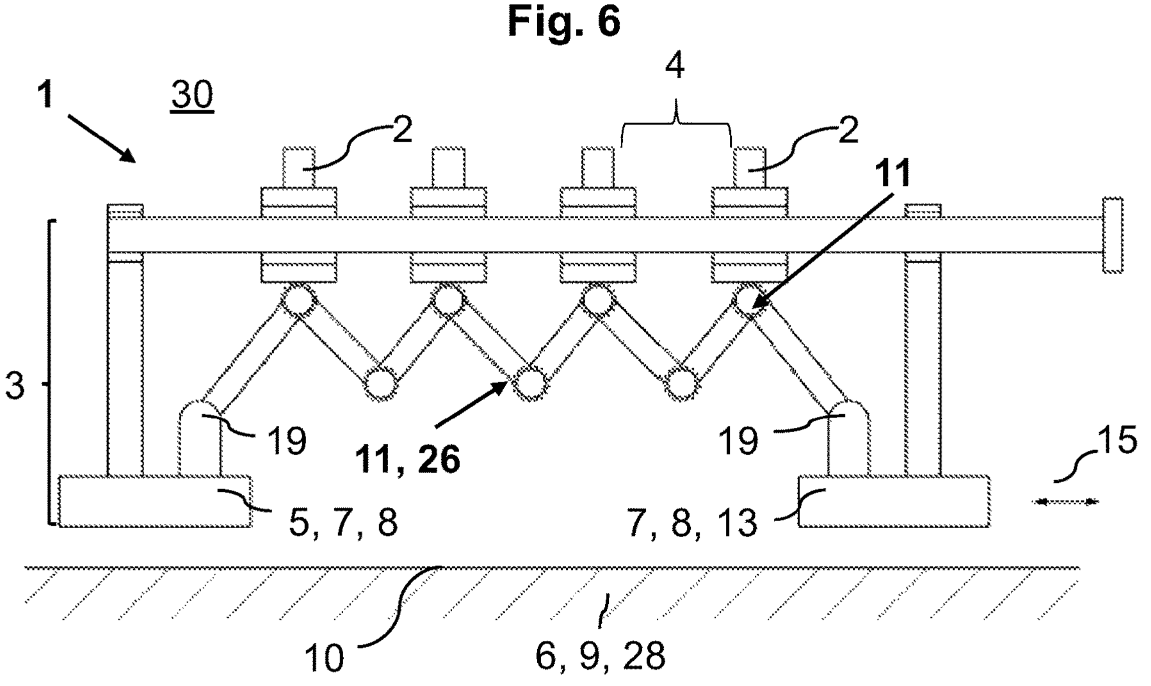
FIG. 6 shows an alternative handling device according to the invention with a gear wheel mechanism.

An alternative gear mechanism 11 is disclosed in FIG. 6. The gear mechanism 11 shown therein is a gear wheel mechanism 26 which provokes a change in distance 4 of the object receivers 2 because of a relative movement 15 of the movers 8. The two movers 8 are pivotably connected to the gear wheel mechanism 26. Alternatively, only one of the movers 8 may be pivotably connected to the gear wheel mechanism 26.

Figure 7:
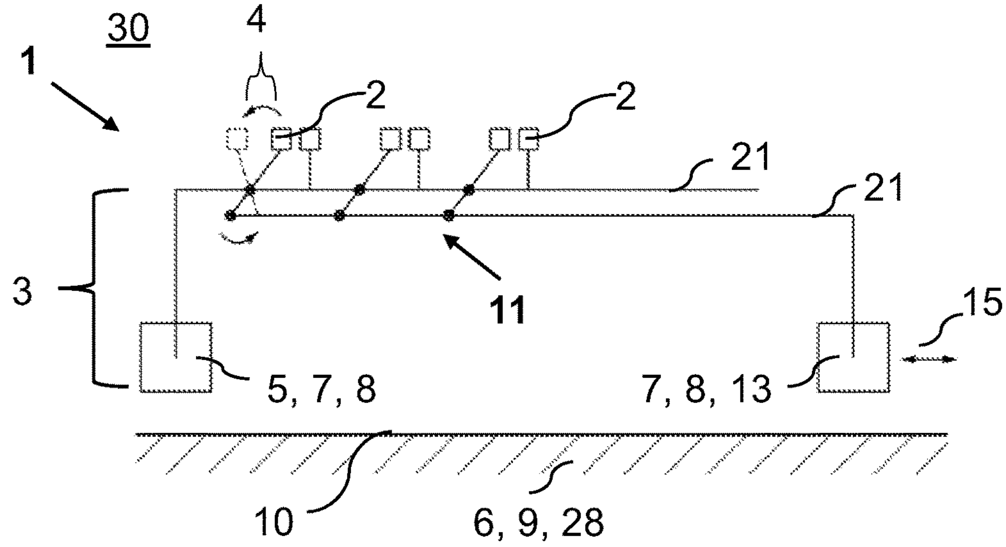
FIG. 7 shows an alternative handling device according to the invention with a rail-mounted gear mechanism.

A further alternative gear mechanism 11 is disclosed in FIG. 7. A respective one of the movers 8 or transport units 5, 13 is connected to a rail 21, wherein the rails 21 are themselves pivotably connected together. A relative movement 15 of the movers 8 or transport units 5, 13 causes a relative change in position of the two rails 21 and hence also of the distance 4 of the object receivers 2.

Figure 9:
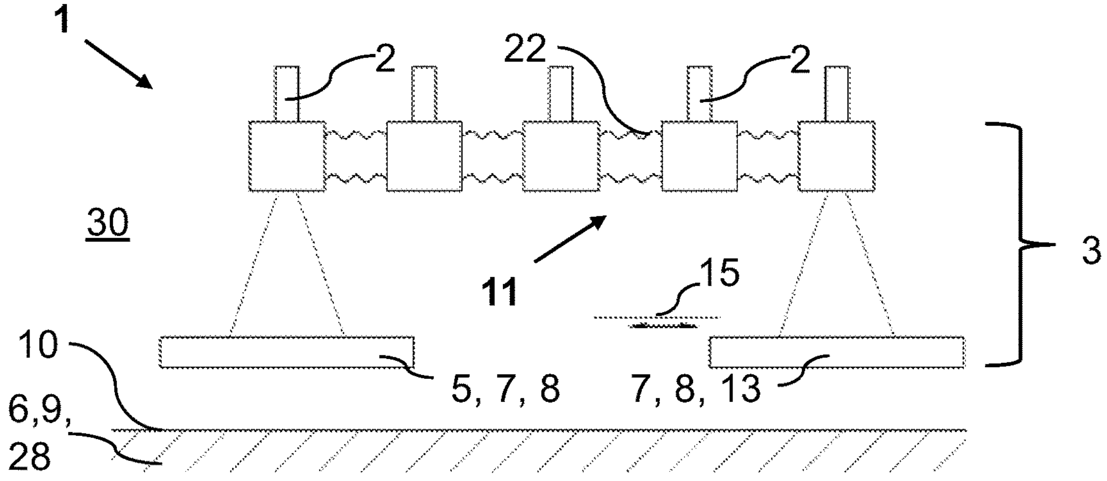
FIG. 9 shows an alternative handling device according to the invention with an elastic gear mechanism.

Further alternative gear mechanisms 11 are disclosed in FIGS. 9 and 10, wherein for example the change in distance 4 can be achieved by means of elastic connecting elements 22 between the object receivers 2 (FIG. 9). In the embodiment shown in FIG. 10, the object receivers 2 are connected by rigid connecting elements 23, wherein a rigid connecting element 23 of an object receiver 2 moves relatively inside an adjacent object receiver 2 during the relative movement 15 of the transport unit 5, 13, leading to a change in distance 4. Further gear mechanisms 11 known to the person skilled in the art may also be used to change a distance 4, so the gear mechanisms 11 illustrated herein are not limitative.

The handling device 1 according to the invention may be erected and/or arranged in a clean room 30 or other protected space.

The invention generally proposes a handling device 1 which has at least two object receivers 2 and at least one adjustment device 3, via which a distance 4 between the at least two object receivers 2 can be changed, wherein at least one transport unit 5 acts on the adjustment device 3 so that the distance 4 between the at least two object receivers 2 can be changed by a movement of the transport unit 5.

LIST OF REFERENCE SIGNS

1 Handling device
2 Object receiver
3 Adjustment device
4 Distance
5 Transport unit
6 Floor
7 Transport system
8 Mover
9 Stator arrangement
10 Drive surface
11 Gear mechanism
12 Scissor mechanism
13 Transport unit
14 Fixed point
15 Relative movement
16 Transport carriage
17 Gripper arm
18 Process station
19 Joint
20 Scissors
21 Rail
22 Elastic connecting element
23 Rigid connecting element
24 Longitudinal extent
25 Coupling
26 Gear wheel mechanism
27 Wall
28 Horizontally arranged work surface
29 Vertically/obliquely arranged work surface
30 Clean room

The invention claimed is:

1. A handling device (1), comprising:

at least two object receivers (2), each of the object receivers (2) being adapted to receive a separate object;

at least one adjustment device (3) via which a distance (4) between the at least two object receivers (2) is changeable;

at least one transport unit (5) that acts on the adjustment device (3) to change the distance (4) between the at least two object receivers (2) by a movement of the transport unit (5); and wherein the adjustment device (3) has a gear mechanism (11) via which the movement of the at least one transport unit (5) is convertible into a change of the distance (4).

2. The handling device (1) as claimed in claim 1, wherein the adjustment device (3) is at least one of a) mechanical or b) changes a longitudinal extent (24) thereof during adjustment of the distance (4).

3. The handling device (1) as claimed in claim 1, wherein the at least one transport unit (5) is part of a transport system (6).

4. The handling device (1) as claimed in claim 1, wherein the at least one transport unit (5) is formed passive.

5. The handling device (1) as claimed in claim 1, wherein the at least one transport unit (5) is at least one of: a) a mover (8), b) magnetically coupled to a stator arrangement (9), or is movable on a drive surface (10) in at least one degree of freedom.

6. The handling device (1) as claimed in claim 1, wherein the handling device (1) is movable.

7. The handling device (1) as claimed in claim 1, wherein the change of the distance (4) is implemented steplessly.

8. The handling device (1) as claimed in claim 1, wherein the distance (4) between the at least two object receivers (2) is at least one of variable in a same way or changes in a defined ratio.

9. The handling device (1) as claimed in claim 1, wherein the adjustment device (3) is pivotably connected to the at least one transport unit (5).

10. The handling device (1) as claimed in claim 1, wherein the adjustment device (3) is connected to a further transport unit (13) such that actuation of the adjustment device (3) is implementable by a movement (15) of the at least one transport unit (5) relative to the further transport unit (13).

11. The handling device (1) as claimed in claim 1, wherein the adjustment device (3) is connected to a fixed point (14) such that actuation of the adjustment device (3) is implementable by a movement (15) of the at least one transport unit (5) relative to the fixed point (14).

12. The handling device (1) as claimed in claim 1, wherein at least one of the object receivers (2) is adapted to receive a transport good.

13. The handling device (1) as claimed in claim 1, wherein at least one of the transport unit (5) or the handling device (1) is movable in at least two degrees of freedom.

14. The handling device (1) as claimed in claim 1, wherein at least one of the transport unit (5) or the handling device (1) is adapted to travel on at least one of a horizontally oriented work surface (28), a work surface (29) arranged obliquely, or a surface arranged vertically relative to the horizontally oriented work surface (28).

15. A method for changing a distance (4) between at least two objects, comprising: providing the handling device (1), as claimed in claim 1, and placing at least two objects in the at least two object receivers.

16. The method according to claim 15, further comprising: in a first pass, supplying the at least two objects at a first distance (4) from one another and discharging the at least two objects at a second distance (4) from one another, and in a second pass, supplying the at least two objects at a third distance (4) from one another and discharging the at least two objects at a fourth distance (4) from one another, wherein at least one of the first and third distances (4) or the second and fourth distances (4) are different from one another.

17. A handling device (1), comprising:

at least two object receivers (2), each of the object receivers (2) being adapted to receive a separate object;

at least one adjustment device (3) via which a distance (4) between the at least two object receivers (2) is changeable;

at least one transport unit (5) that acts on the adjustment device (3) to change the distance (4) between the at least two object receivers (2) by a movement of the transport unit (5); and the at least one transport unit (5) includes a mover (8) that is magnetically coupled to a stator arrangement (9), such that the stator arrangement (9) causes the mover (8) to hover frictionlessly over a drive surface (10).

* * * * *